(12) United States Patent
Gossett et al.

(10) Patent No.: US 9,599,250 B2
(45) Date of Patent: Mar. 21, 2017

(54) ACTUATOR APPARATUS HAVING INTEGRAL YOKE TUBING

(71) Applicant: FISHER CONTROLS INTERNATIONAL LLC, Marshalltown, IA (US)

(72) Inventors: James L. Gossett, Marshalltown, IA (US); William E. Wears, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 97 days.

(21) Appl. No.: 14/183,905

(22) Filed: Feb. 19, 2014

(65) Prior Publication Data

US 2015/0233489 A1    Aug. 20, 2015

(51) Int. Cl.
| | | |
|---|---|---|
| F16K 31/126 | (2006.01) | |
| F16K 37/00 | (2006.01) | |
| F16K 15/18 | (2006.01) | |

(52) U.S. Cl.
CPC .......... *F16K 31/1262* (2013.01); *F16K 15/18* (2013.01); *F16K 37/0008* (2013.01); *Y10T 137/8275* (2015.04)

(58) Field of Classification Search
CPC .. F16K 31/1262; F16K 37/0008; F16K 15/18; F16K 15/185
See application file for complete search history.

(56) References Cited

U.S. PATENT DOCUMENTS

| | | | |
|---|---|---|---|
| 3,901,269 A | | 8/1975 | Henderson |
| 4,922,952 A | | 5/1990 | Kemmler |
| 5,279,325 A | * | 1/1994 | Kaspers ......................... 137/270 |
| 5,288,052 A | * | 2/1994 | Black et al. ................. 251/30.01 |
| 5,469,744 A | * | 11/1995 | Patton et al. ..................... 73/644 |
| 5,694,515 A | * | 12/1997 | Goswami et al. ............. 392/480 |
| 7,219,691 B2 | * | 5/2007 | Gethmann et al. ........... 137/554 |
| 2013/0074788 A1 | * | 3/2013 | Ignatan et al. ............. 122/479.1 |
| 2014/0014859 A1 | | 1/2014 | McCarty |

FOREIGN PATENT DOCUMENTS

| | | |
|---|---|---|
| EP | 2184522 A1 | 5/2010 |
| WO | WO-2013/061291 A1 | 5/2013 |

OTHER PUBLICATIONS

International Search Report and Written Opinion for PCT/US2015/016489 dated May 18, 2015, 12 pgs.
Fisher 657 and 667 Diaphragm Actuators Product Bulletin, dated May 31, 2012, 15 pgs.

* cited by examiner

*Primary Examiner* — Marina Tiet Jen
*Assistant Examiner* — Daphne M Barry
(74) *Attorney, Agent, or Firm* — Marshall, Gerstein & Borun LLP

(57) ABSTRACT

An actuator apparatus includes and actuator and a yoke. The actuator includes an upper casing and a lower casing defining a cavity and an actuating device disposed at least partially within the cavity and dividing the cavity into an upper chamber and a lower chamber. The yoke is connected to the actuator and has an actuator spring disposed within a body of the yoke and a yoke tube extending longitudinally through the body of the yoke. The yoke tube extends from an aperture in the lower casing of the actuator and provides an air passage that fluidly connects the lower chamber of the actuator and a controller.

19 Claims, 4 Drawing Sheets

ACTUATOR APPARATUS HAVING INTEGRAL YOKE TUBING

FIELD OF THE DISCLOSURE

This disclosure relates generally to actuators for use with fluid valves and, more specifically, to actuator apparatus having internal fluid passageways.

BACKGROUND

Control valves are commonly used in process control systems to control the flow of process fluids (e.g., liquids or gases). A control valve typically includes an actuator apparatus (e.g., a pneumatic actuator, a hydraulic actuator, etc.) operatively coupled to the flow control member of a fluid valve to automate the control valve. In operation, a controller is often employed to supply a control fluid (e.g., air) to the actuator which, in turn, positions the flow control member (e.g., a valve gate, a plug, a closure member, etc.) to a desired position relative to a valve seat to control or regulate the fluid flow through the valve.

As shown in FIG. 1, some known control valve assemblies 100 use a single spring actuator apparatus 110, which typically have an actuator 112, a yoke 140 that is used to couple the actuator apparatus 110 to the fluid valve 170, and a controller 160. Actuator 112 has an upper casing 116, having a vent assembly 118, and a lower casing 120 secured to upper casing 116 with nuts 122 and bolts 124 and defining a cavity 114. A diaphragm 130 is secured at its edge between upper casing 116 and lower casing 120 and at an inner portion between an upper diaphragm plate 136 and a lower diaphragm plate 138. Diaphragm 130 is positioned in cavity 114 to define an upper chamber 132 and a lower chamber 134. The examples discussed herein are directed to diaphragm actuators, however, the control valve assemblies could also contain piston actuators or any other well-known type of actuator.

Yoke 140 has a body 142 that is secured to actuator 112 at a first end of body 142 and to fluid valve 170 at a second end of body 142, opposite the first end. A generally L-shaped passageway 145 is formed in body 142 near the first end and is in fluid communication with an aperture 121 in lower casing 120 of actuator 112 to provide a control fluid (e.g., pneumatic air) from external tubing 162 to lower chamber 134 of actuator 112. An actuator stem 146 extends through body 142 and has a spring seat 148 positioned near one end and is operatively connected to diaphragm 130, through upper diaphragm plate 136 and lower diaphragm plate 138, via a cap screw 164. An actuator spring 150 is positioned within a cylindrical portion 144 of body 142 and extends between the first end of body 142 and spring seat 148 to bias actuator stem 146 away from actuator 112 and toward fluid valve 170. A spring adjuster 149 is threaded onto an end of actuator stem 146 and can be used to set the pre-load of actuator spring 150. A travel indicator 152 is mounted to body 142, near an end of actuator stem 146, and can be used to visually determine the position of flow control member 178 in fluid valve 170.

Controller 160 provides a control fluid (e.g., pneumatic air) to lower chamber 134 via external tubing 162 and passageway 145 in yoke 140 and can be mounted to yoke 140 or can be positioned in another location proximate actuator 112. Regardless of the mounting or positioning of controller 160, external tubing 162 is used to fluidly couple controller 160 and lower pressure chamber 134 of actuator 112. However, external tubing 162 can become damaged or dislodged, thereby affecting the accuracy of actuator apparatus 110 and, thus, a desired fluid flow through fluid valve 170.

Fluid valve 170 generally has a housing 172 that defines a fluid flow path from an inlet 174 to an outlet 176. A valve seat 180 is disposed with the fluid flow path and a flow control member 178 can be moved into and out of sealing contact with valve seat 180 to control the flow of fluid through fluid valve 170. A valve stem 182 extends from flow control member 178, through housing 172, and connects to actuator stem 146 via stem connector assembly 154.

In operation, controller 160 provides a control fluid through external tubing 162 and passageway 145 in yoke 140 to lower chamber 134 of actuator 112 to provide a pressure differential across diaphragm 130. The pressure differential causes diaphragm 130 to move actuator stem 146, and thus valve stem 182, such that flow control member 178 moves in a rectilinear path relative to valve seat 180 to control fluid flow through fluid valve 170.

However, external tubing 162 can become damaged or dislodged, thereby restricting or preventing the control fluid from flowing between controller 160 and lower chamber 134. For example, a process fluid flowing through fluid valve 170 may impart a frequency to control valve assembly 100 that is substantially equal to a resonant frequency of actuator 112 and/or control valve assembly 100, causing actuator 112 and/or control valve assembly 100 and, thus, external tubing 162 to vibrate, which can cause external tubing 162 to become dislodged or damaged, thereby affecting the operation of actuator 112 and, thus, the accuracy of the position of flow control member 178 relative to valve seat 180.

To address these problems, some known compact, multi-spring actuator apparatus can eliminate the need to employ external tubing to fluidly couple the controller and a chamber of the actuator by including internal passageways in the yoke, rather than external tubing. Control valve assemblies using compact actuators apparatus typically have the actuator spring(s) positioned within upper casing, rather than in yoke. With actuator spring(s) removed from yoke, yoke can be made smaller and an internal passageway can be drilled or machined longitudinally through body of yoke to fluidly couple controller to lower chamber of actuator. However, multi-spring actuator apparatus have the drawback that the pre-load of the springs are set by the size of the actuator casing and are not adjustable. Conversely, the pre-load of a single spring actuator can be adjusted or bench set.

As shown in FIG. 2, control valve assemblies 200 having compact, multi-spring actuator apparatus 210 typically have an actuator 212, a yoke 240 that is used to couple the actuator apparatus 210 to the fluid valve 270, and a controller 260. Similar to the actuator 112 shown in FIG. 1, actuator 212 has an upper casing 216, having a vent assembly 218, and a lower casing 220 secured to upper casing 216 with nuts 222 and bolts 224 and defining a cavity 214. A diaphragm 230 is secured at its edge between upper casing 216 and lower casing 220 and at an inner portion is positioned adjacent an upper diaphragm plate 236. Diaphragm 230 is positioned in cavity 214 to define an upper chamber 232 and a lower chamber 234. Unlike the actuator 112 shown in FIG. 1, actuator 212 also has one or more actuator springs 251 positioned within upper chamber 232, between upper casing 216 and upper diaphragm plate 236, to bias diaphragm 230, and actuator stem 246 toward fluid valve 270.

Yoke 240 has a body 242, which is smaller than the body 142 of yoke 140 in FIG. 1, which is secured to actuator 212 at a first end of body 242 and to fluid valve 270 at a second end of body 242, opposite the first end. Due to the smaller size of body 242, an internal passageway 256 can be machined, drilled, or otherwise formed longitudinally through body 242 of yoke 240 from the first end to an area proximate travel indicator 252. Internal passageway 256 is in fluid communication with lower chamber 234 and can be used to provide a control fluid (e.g., pneumatic air) from controller 260 to lower chamber 234 of actuator 212. An actuator stem 246 extends through body 242 and is operatively connected to diaphragm 230 through upper diaphragm plate 236, via a cap screw 264. A travel indicator 252 is mounted to body 242, near an end of actuator stem 246, and can be used to visually determine the position of flow control member 278 in fluid valve 270.

Controller 260 provides a control fluid (e.g., pneumatic air) to lower chamber 234 via internal passageway 256 in yoke 240 and can be mounted to yoke 240 to fluidly couple controller 260 and lower pressure chamber 234 of actuator 212.

Fluid valve 270 generally has a housing 272 that defines a fluid flow path from an inlet 274 to an outlet 276. A valve seat 280 is disposed with the fluid flow path and a flow control member 278 can be moved into and out of sealing contact with valve seat 280 to control the flow of fluid through fluid valve 270. A valve stem 282 extends from flow control member 278, through housing 272, and connects to actuator stem 246 via stem connector assembly (not shown).

In operation, controller 260 provides a control fluid through internal passageway 256 in yoke 240 to lower chamber 234 of actuator 212 to provide a pressure differential across diaphragm 230. The pressure differential causes diaphragm 230 to move actuator stem 246, and thus valve stem 282, such that flow control member 278 moves in a rectilinear path relative to valve seat 280 to control fluid flow through fluid valve 270.

To fluidly couple controller 260 to lower chamber 234, controller 260 can be coupled or mounted to yoke 240 and internal passageway 256 formed in yoke 240 to fluidly couple an outlet port of controller 260 to lower chamber 234 of actuator 212. Eliminating external tubing in this manner significantly reduces or eliminates the possibility of damage to external tubing that may otherwise occur, thereby increasing the accuracy and reliability of actuator 212 and fluid valve 270.

However, due to the size and height of yoke 140 in single spring actuator apparatus 110, a longitudinal internal passageway cannot be formed through yoke 140 from the first end all the way to an area proximate the travel indicator 152. The actuator spring 150 in single spring actuator apparatus 110 is large in diameter, long, and located inside the yoke 140, while the controller 160 is located low on the yoke 140. Due to the extended length and small diameter that would be required of a longitudinal internal passageway in a single spring actuator apparatus 110, standard drilling or machining processes cannot be used. In addition, an insert could not be used to cast a longitudinal internal passageway into yoke 140 in the casting process. Again, due to the extended length and small diameter, any insert used would be weak and would either break during the manufacturing process or would not be able to be removed.

BRIEF SUMMARY OF THE DISCLOSURE

In accordance with one exemplary aspect of the present invention, an actuator apparatus includes an actuator and a yoke. The actuator includes an upper casing and a lower casing defining a cavity and an actuating device disposed at least partially within the cavity and dividing the cavity into an upper chamber and a lower chamber. The yoke is connected to the actuator and has an actuator spring disposed within a body of the yoke and a yoke tube extending longitudinally through the body of the yoke. The yoke tube extends from an aperture in the lower casing of the actuator and provides an air passage that fluidly connects the lower chamber of the actuator and a controller.

In accordance with another exemplary aspect of the present invention, a control valve assembly includes an actuator apparatus and a fluid valve. The actuator apparatus includes an actuator, a yoke, and a controller. The actuator includes an upper casing and a lower casing defining a cavity and an actuating device disposed at least partially within the cavity and dividing the cavity into an upper chamber and a lower chamber. The yoke is connected to the actuator and has an actuator spring disposed within a body of the yoke and a yoke tube extending longitudinally through the body of the yoke. The controller is mounted to the body of the yoke and has an outlet port. The yoke tube extends from an aperture in the lower casing of the actuator to the outlet port of the controller and provides an air passage that fluidly connects the lower chamber of the actuator and the controller. The fluid valve is connected to the yoke of the actuator and operatively connected to the actuating device.

In further accordance with any one or more of the foregoing exemplary aspects of the present invention, an actuator apparatus and control valve assembly may further include, in any combination, any one or more of the following preferred forms.

In one preferred form, the upper casing of the actuator comprises a vent assembly.

In another preferred form, the actuating device is a diaphragm.

In another preferred form, the actuator apparatus includes a diaphragm plate disposed adjacent the diaphragm and an actuator stem extending at least partially through the body of the yoke and connected to the diaphragm plate to operatively connect the diaphragm to the actuator stem.

In another preferred form, the actuator apparatus includes a spring seat mounted on the actuator stem and a spring adjuster threaded onto the actuator stem to adjust the position of the spring seat and the pre-load of the actuator spring.

In another preferred form, the actuator apparatus includes a second diaphragm plate disposed adjacent the diaphragm opposite the diaphragm plate.

In another preferred form, the actuator apparatus includes a travel indicator mounted to the body of the yoke and operatively connected to the actuator stem.

In another preferred form, a first end of the yoke tube is adjacent the aperture in the lower casing of the actuator and a second end of the yoke tube is adjacent the travel indicator.

In another preferred form, the yoke tube is cast into the body of the yoke.

In another preferred form, the body of the yoke is cast iron and the yoke tube is stainless steel.

In another preferred form, the control valve assembly includes a valve stem connected to the actuator stem to operatively connect a flow control member of the fluid valve to the diaphragm.

DETAILED DESCRIPTION

Figure 1:
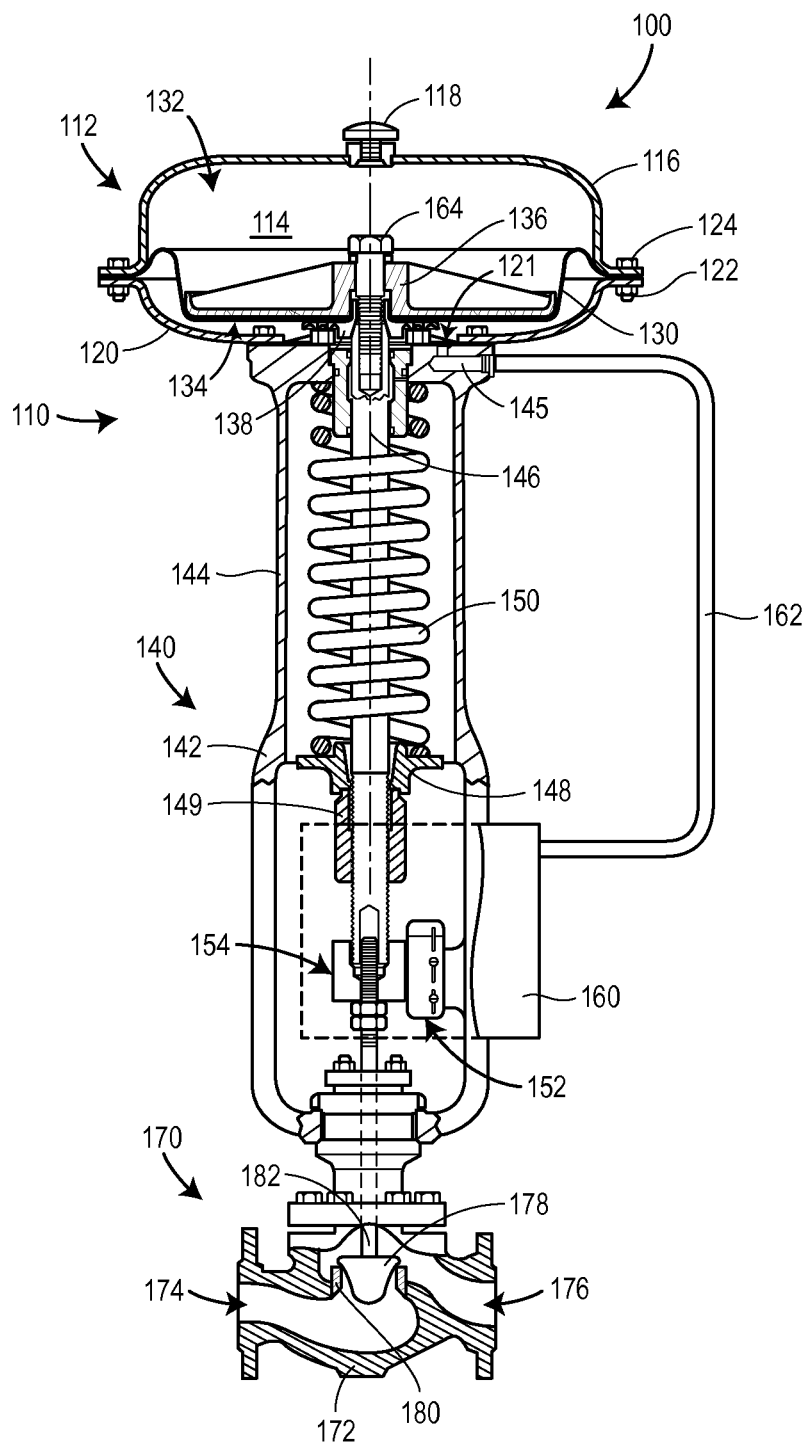
FIG. 1 is a front partial cross-sectional view of a known single spring actuator apparatus and control valve having external tubing.
Figure 2:
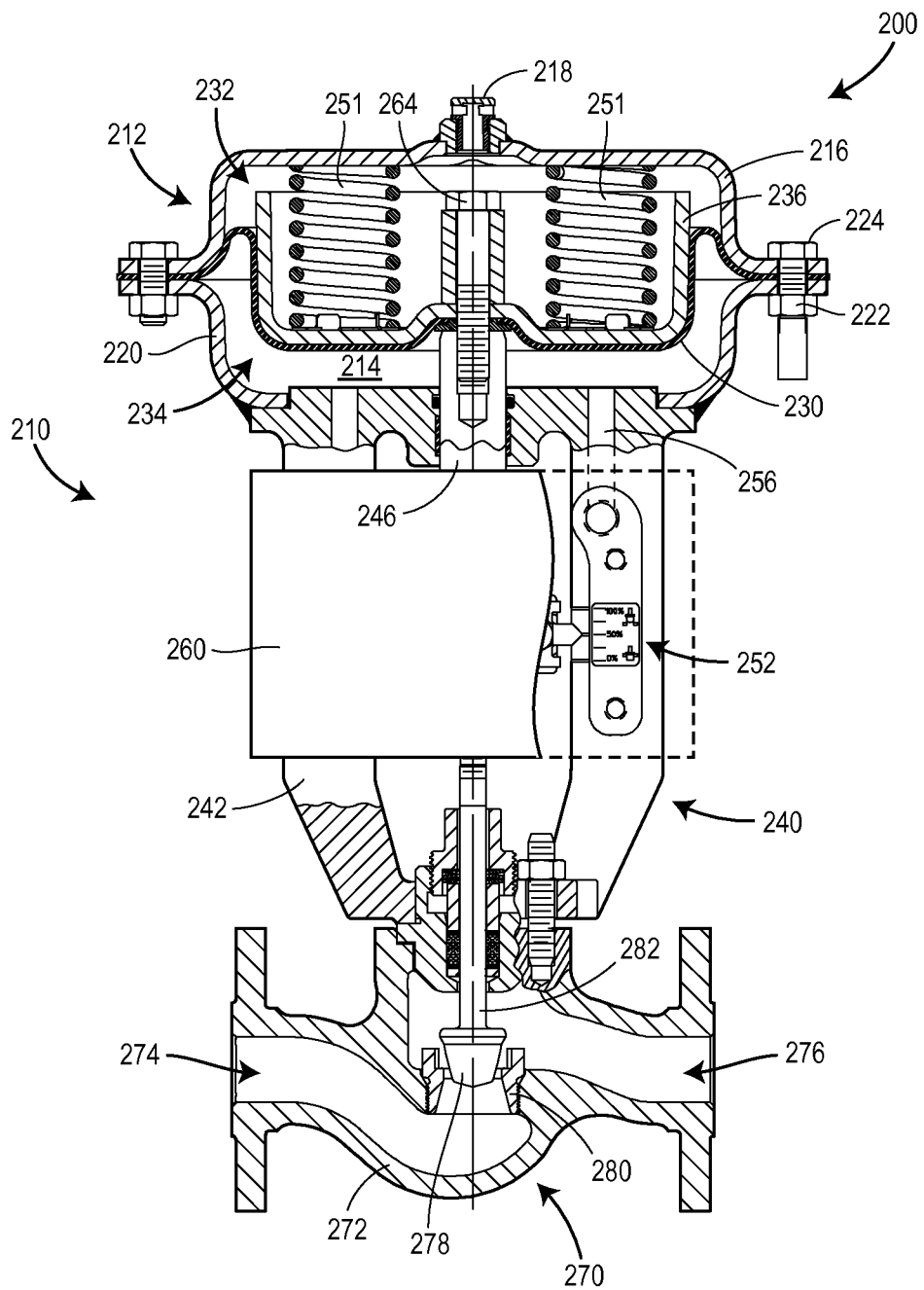
FIG. 2 is a front partial cross-sectional view of a known compact, multi-spring actuator apparatus and control valve having an internal passageway.
Figure 3:
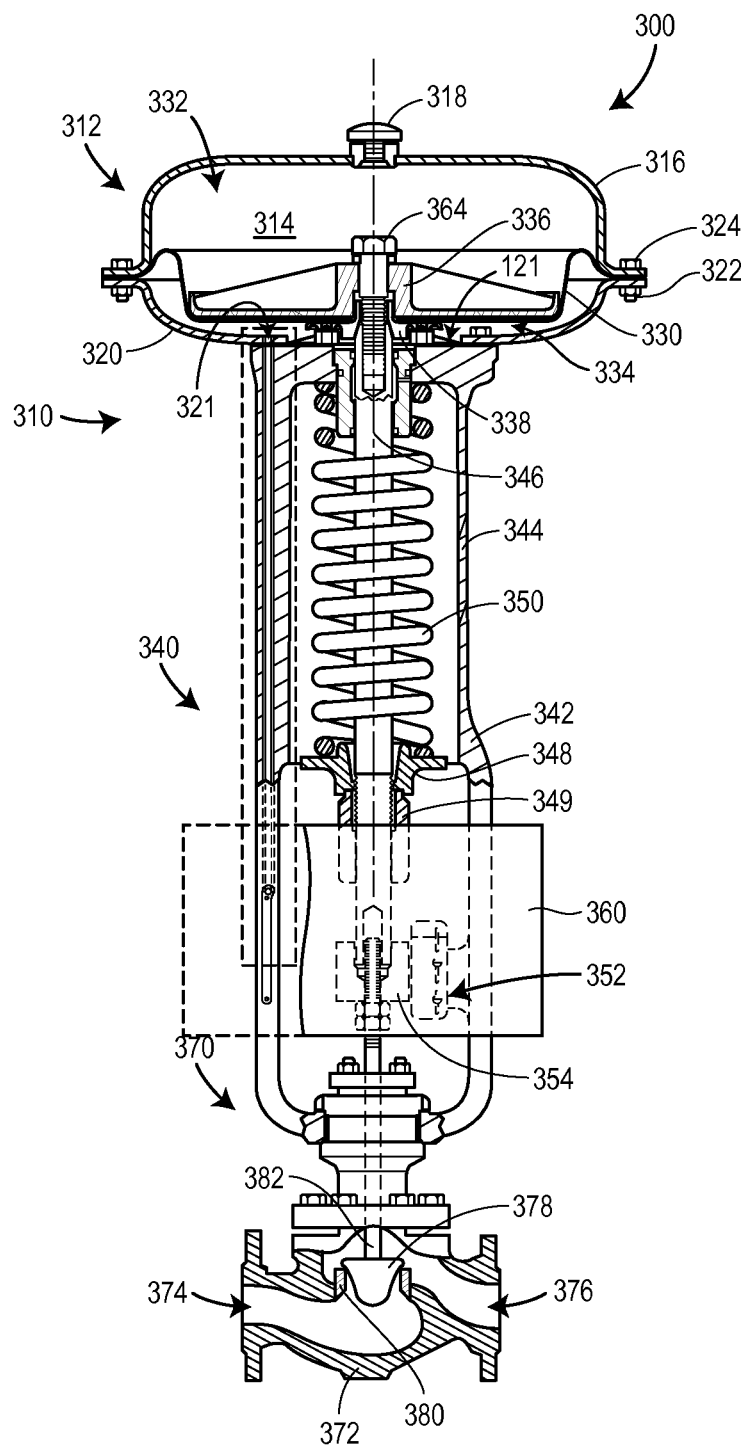
FIG. 3 is a front partial cross-sectional view of an example single spring actuator apparatus and control valve having integral tubing.
Figures 4, 5:
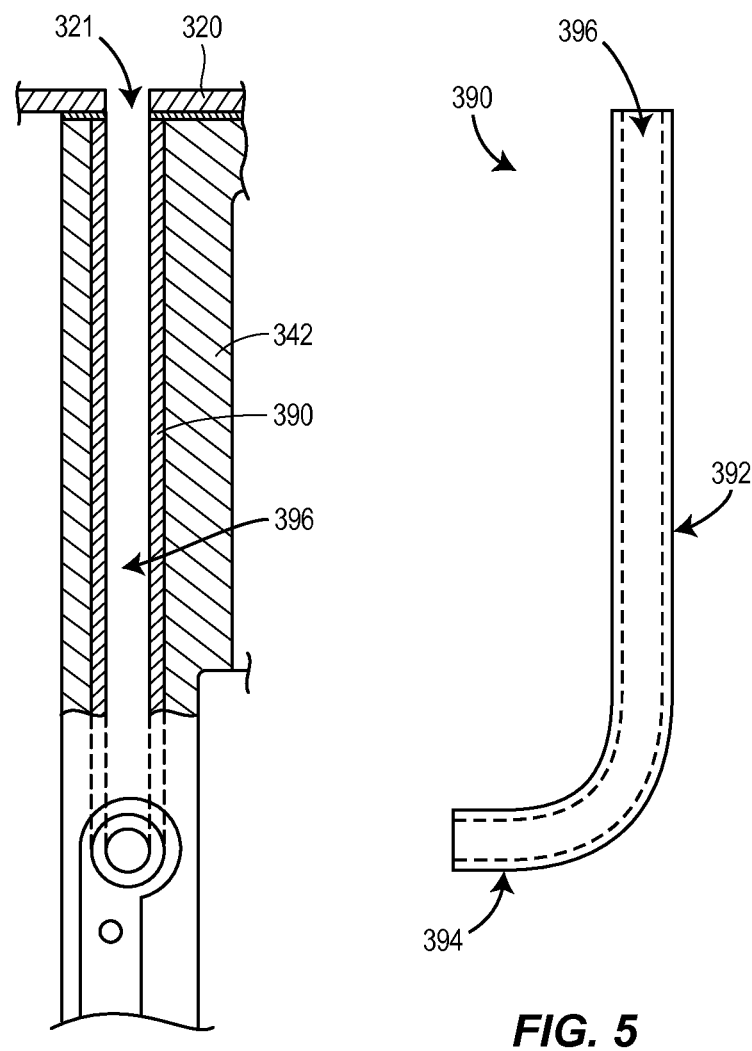
FIG. 4 is an enlarged view of a portion of FIG. 3.
FIG. 5 is a side view of the yoke tube of FIG. 4.

An example control valve assembly having a single spring actuator apparatus that does not use external tubing to connect the controller and the actuator is shown in FIGS. 3-5. The example single spring actuator has a yoke tube molded into the body of the yoke to create a longitudinal passageway through the body from the actuator to an area proximate the travel indicator mounted to the yoke. This internal passageway allows the controller to be mounted to the yoke and to be in fluid communication with the lower chamber of the actuator without the need for external tubing, which can be damaged or become dislodged during operation of the control valve assembly.

As illustrated in FIG. 3, the example control valve assembly 300 includes a single spring actuator apparatus 310 coupled to a fluid valve 370. Actuator apparatus 310 includes an actuator 312, a yoke 340 that is used to couple the actuator apparatus 310 to the fluid valve 370, and a controller 360. Actuator 312 has an upper casing 316, having a vent assembly 318, and a lower casing 320 secured to upper casing 316 with nuts 322 and bolts 324 and defining a cavity 314. A diaphragm 330 is secured at its edge between upper casing 316 and lower casing 320 and at an inner portion between an upper diaphragm plate 336 and a lower diaphragm plate 338. Diaphragm 330 is positioned in cavity 314 to define an upper chamber 332 and a lower chamber 334. While the example control valve assembly 300 described herein includes a diaphragm 330, control valve assembly 300 could use any other type of well-known actuating device in place of diaphragm 330 as well, such as a piston.

Yoke 340 has a body 342 that is secured to actuator 312 at a first end of body 342 and to fluid valve 370 at a second end of body 342, opposite the first end. A yoke tube 390 is cast into body 342 of yoke 340 during the casting process and extends from the first end of body 342 to an area proximate the travel indicator. A first portion 392 of yoke tube 390 extends longitudinally through body 342 of yoke 340 from the first end of body 342, through cylindrical portion 344, and to the area proximate the travel indicator and is in fluid communication with lower chamber 334 through an aperture 321 in lower casing 320 of actuator 312. A second portion 394 of yoke tube 390 extends perpendicular from first portion 392 and provides fluid communication between first portion 392 and an output of controller 360. First and second portions 392, 394 of yoke tube 390 provide an air passage 396 between controller 360 and lower chamber 334 of actuator 312. Therefore, yoke tube 390 can be used to provide a control fluid (e.g., pneumatic air) from controller 360 to lower chamber 334 of actuator 312 without the need for external tubing. In one example, body 342 of yoke 340 could be cast iron and yoke tube 390 could be stainless steel. However, other material combinations could be used as long as the material melting temperature for yoke tube 390 is greater than the material melting temperature for body 342 of yoke 340. An actuator stem 346 extends through body 342 and has a spring seat 348 positioned near one end and is operatively connected to diaphragm 330, through upper diaphragm plate 336 and lower diaphragm plate 338, via a cap screw 364. An actuator spring 350 is positioned within a cylindrical portion 344 of body 342 and extends between the first end of body 342 and spring seat 348 to bias actuator stem 346 away from actuator 312 and toward fluid valve 370. A spring adjuster 349 is threaded onto an end of actuator stem 346 and can be used to set the pre-load of actuator spring 350. A travel indicator 352 is mounted to body 342, near an end of actuator stem 346, and can be used to visually determine the position of flow control member 378 in fluid valve 370.

Controller 360 provides a control fluid (e.g., pneumatic air) to lower chamber 334 via yoke tube 390 and aperture 321 in lower casing 320 and can be mounted to yoke 340 to fluidly couple controller 360 and lower pressure chamber 334 of actuator 312.

Fluid valve 370 generally has a housing 372 that defines a fluid flow path from an inlet 374 to an outlet 376. A valve seat 380 is disposed with the fluid flow path and a flow control member 378 can be moved into and out of sealing contact with valve seat 380 to control the flow of fluid through fluid valve 370. A valve stem 382 extends from flow control member 378, through housing 372, and connects to actuator stem 346 via a stem connector assembly 354.

In operation, controller 360 provides a control fluid through yoke tube 390 to lower chamber 334 of actuator 312 to provide a pressure differential across diaphragm 330. The pressure differential causes diaphragm 330 to move actuator stem 346, and thus valve stem 382, such that flow control member 378 moves in a rectilinear path relative to valve seat 380 to control fluid flow through fluid valve 370.

To fluidly couple controller 360 to lower chamber 334, controller 360 can be coupled or mounted to yoke 340 and yoke tube 390 cast into yoke 340 to fluidly couple an outlet port of controller 360 to lower chamber 334 of actuator 312. This again eliminates the need for external tubing, which significantly reduces or eliminates the possibility of damage to external tubing that may otherwise occur, thereby increasing the accuracy and reliability of actuator 312 and fluid valve 370.

While various embodiments have been described above, this disclosure is not intended to be limited thereto. Variations can be made to the disclosed embodiments that are still within the scope of the appended claims.

What is claimed is:

1. An actuator apparatus for a control valve, comprising:
an actuator comprising an upper casing and a lower casing defining a cavity and an actuating device disposed at least partially within the cavity and dividing the cavity into an upper chamber and a lower chamber; and
a yoke having a first end connected to the actuator and a second end arranged for connection to the control valve and comprising an actuator spring disposed within a body of the yoke, the yoke including a cylindrical portion and a continuous yoke tube having a first portion extending longitudinally through and formed within the cylindrical portion of the yoke and directly connected to the cavity of the actuator via an aperture in one of the upper casing or the lower casing, and a second portion extending perpendicular to the first portion at a location proximate the second end, the yoke tube extending from the aperture in the actuator, through the first portion and the second portion, and providing an air passage that fluidly connects the cavity of the actuator and a controller;
the controller including an outlet port;

wherein the second portion of the yoke tube is connected to the outlet port of the controller adjacent a second end of the yoke; and wherein the yoke tube has a material melting temperature that is greater than a material melting temperature of the body of the yoke.

2. The actuator apparatus of claim 1, wherein the upper casing of the actuator comprises a vent assembly.

3. The actuator apparatus of claim 1, wherein the actuating device is a diaphragm.

4. The actuator apparatus of claim 3, further comprising:
a diaphragm plate disposed adjacent the diaphragm; and
an actuator stem extending at least partially through the body of the yoke and connected to the diaphragm plate to operatively connect the diaphragm to the actuator stem.

5. The actuator apparatus of claim 4, further comprising a spring seat mounted on the actuator stem and a spring adjuster threaded onto the actuator stem to adjust the position of the spring seat and the pre-load of the actuator spring.

6. The actuator apparatus of claim 4, further comprising a second diaphragm plate disposed adjacent the diaphragm opposite the diaphragm plate.

7. The actuator apparatus of claim 1, further comprising a travel indicator mounted to the body of the yoke proximate the second end of the yoke and operatively connected to an actuator stem.

8. The actuator apparatus of claim 7, wherein the yoke tube is cast into the body of the yoke.

9. The actuator apparatus of claim 8, wherein the body of the yoke is cast iron and the yoke tube is stainless steel.

10. The actuator apparatus of claim 1, wherein the yoke tube is integrally formed in the body of the yoke and wherein the yoke tube is made from a dissimilar metal than the yoke.

11. A control valve assembly, comprising:
an actuator apparatus, the actuator apparatus comprising:
an actuator comprising an upper casing and a lower casing defining a cavity and an actuating device disposed at least partially within the cavity and dividing the cavity into an upper chamber and a lower chamber;
a yoke connected to the actuator and comprising an actuator spring disposed within a body of the yoke, the body of the yoke including a first end secured to the lower casing of the actuator and a second end, the yoke including a cylindrical portion and a yoke tube extending longitudinally through the cylindrical portion of the yoke;
the yoke tube including a first portion and a second portion, the first portion formed within the cylindrical portion and directly connected to the cavity of the actuator via an aperture in the lower casing, the second portion extending at an angle relative to the first portion at a location proximate the second end; and
a controller mounted to the body of the yoke adjacent the second end and having an outlet port, the yoke tube extending from an aperture in the lower casing of the actuator to the outlet port of the controller and providing an air passage that fluidly connects the lower chamber of the actuator and the outlet port of the controller, the second portion of the yoke tube connected to the outlet port of the controller adjacent the second end of the yoke;
wherein the yoke tube is integrally formed in the body of the yoke and wherein the yoke tube is made from a dissimilar metal than the yoke; and
a fluid valve connected to the second end of the yoke and operatively connected to the actuator.

12. The control valve assembly of claim 11, wherein the upper casing of the actuator comprises a vent assembly.

13. The control valve assembly of claim 11, wherein the actuating device is a diaphragm.

14. The control valve assembly of claim 13, further comprising:
a diaphragm plate disposed adjacent the diaphragm; and
an actuator stem extending at least partially through the body of the yoke and connected to the diaphragm plate to operatively connect the diaphragm to the actuator stem.

15. The control valve assembly of claim 14, further comprising a spring seat mounted on the actuator stem and a spring adjuster threaded onto the actuator stem to adjust the position of the spring seat and the pre-load of the actuator spring.

16. The control valve assembly of claim 14, wherein the fluid valve comprises a valve stem connected to the actuator stem to operatively connect a flow control member of the fluid valve to the diaphragm.

17. The control valve assembly of claim 14, further comprising a travel indicator mounted to the body of the yoke adjacent the second end and operatively connected to the actuator stem.

18. The control valve assembly of claim 11, wherein the yoke tube is cast into the body of the yoke.

19. The control valve assembly of claim 11, wherein the yoke tube has a material melting temperature that is greater than a material melting temperature of the body of the yoke.

* * * * *

UNITED STATES PATENT AND TRADEMARK OFFICE
CERTIFICATE OF CORRECTION

PATENT NO. : 9,599,250 B2  
APPLICATION NO. : 14/183905  
DATED : March 21, 2017  
INVENTOR(S) : James L. Gossett et al.

Page 1 of 1

It is certified that error appears in the above-identified patent and that said Letters Patent is hereby corrected as shown below:

On the Title Page

At item (57), Line 1, "includes and" should be -- includes an --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*